(12) United States Patent
Kim

(10) Patent No.: US 11,913,802 B2
(45) Date of Patent: Feb. 27, 2024

(54) AUTONOMOUS DRIVING SYSTEM AND AUTONOMOUS DRIVING METHOD

(71) Applicant: HL KLEMOVE CORP., Incheon (KR)

(72) Inventor: Taehan Kim, Anyang-si (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 17/388,714

(22) Filed: Jul. 29, 2021

(65) Prior Publication Data

US 2022/0065653 A1    Mar. 3, 2022

(30) Foreign Application Priority Data

Aug. 28, 2020 (KR) ........................ 10-2020-0109296

(51) Int. Cl.
| | |
|---|---|
| *G01C 21/00* | (2006.01) |
| *B60W 60/00* | (2020.01) |
| *B60W 50/00* | (2006.01) |
| *G01S 13/931* | (2020.01) |
| *G01S 13/86* | (2006.01) |

(52) U.S. Cl.
CPC .............. *G01C 21/38* (2020.08); *B60W 50/00* (2013.01); *B60W 60/001* (2020.02); *G01S 13/867* (2013.01); *G01S 13/931* (2013.01); *B60W 2050/0057* (2013.01); *B60W 2420/42* (2013.01); *B60W 2552/53* (2020.02); *B60W 2556/50* (2020.02)

(58) Field of Classification Search
CPC ................. B60W 50/00; B60W 50/02; B60W 2050/005; B60W 2050/0057; B60W 60/001; B60W 60/0053; B60W 60/0054; B60W 2420/52; B60W 2552/10; B60W 2552/53; B60W 2552/20; B60W 2552/30; B60W 2556/40; B60W 2556/45; B60W 2556/50; B60W 2756/10; G01S 13/865; G01S 13/931; G01C 21/38; G01C 21/3885; G01C 3/00
See application file for complete search history.

(56) References Cited

U.S. PATENT DOCUMENTS

| | | | |
|---|---|---|---|
| 8,370,028 B2 * | 2/2013 | Yamada ................. | B60Q 1/085 701/445 |
| 2003/0109980 A1 * | 6/2003 | Kojima .................. | G08G 1/165 701/25 |
| 2010/0082238 A1 * | 4/2010 | Nakamura ............. | G01C 21/32 701/532 |
| 2010/0106410 A1 * | 4/2010 | Adachi ............ | G08G 1/096716 701/532 |

(Continued)

*Primary Examiner* — Russell Frejd
*Assistant Examiner* — Brandon Z Willis
(74) *Attorney, Agent, or Firm* — Hauptman Ham, LLP

(57) ABSTRACT

Disclosed herein an autonomous driving system includes a first sensor installed in a vehicle, having a field of view facing in front of the vehicle, and configured to acquire front image data; a second sensor selected from the group consisting of a radar and a light detection and ranging, installed in the vehicle, having a detection field of view facing in front of the vehicle, and configured to acquire forward detection data; a communicator configured to receive a high definition map at a current location of the vehicle from an external server; and a controller including a processor configured to process the high definition map, the front image data, and the forward detection data.

18 Claims, 10 Drawing Sheets

(56) References Cited

U.S. PATENT DOCUMENTS

| | | | |
|---|---|---|---|
| 2014/0157175 A1* | 6/2014 | Johansson | B60K 35/00 |
| | | | 715/771 |
| 2019/0293435 A1* | 9/2019 | Mori | G01S 13/867 |
| 2019/0346847 A1* | 11/2019 | Kamata | G05D 1/0257 |
| 2020/0377078 A1* | 12/2020 | Liu | G05D 1/0214 |
| 2021/0364320 A1* | 11/2021 | Mennen | B60W 60/001 |
| 2021/0372816 A1* | 12/2021 | Nishida | G08G 1/0967 |

\* cited by examiner

FIG. 6
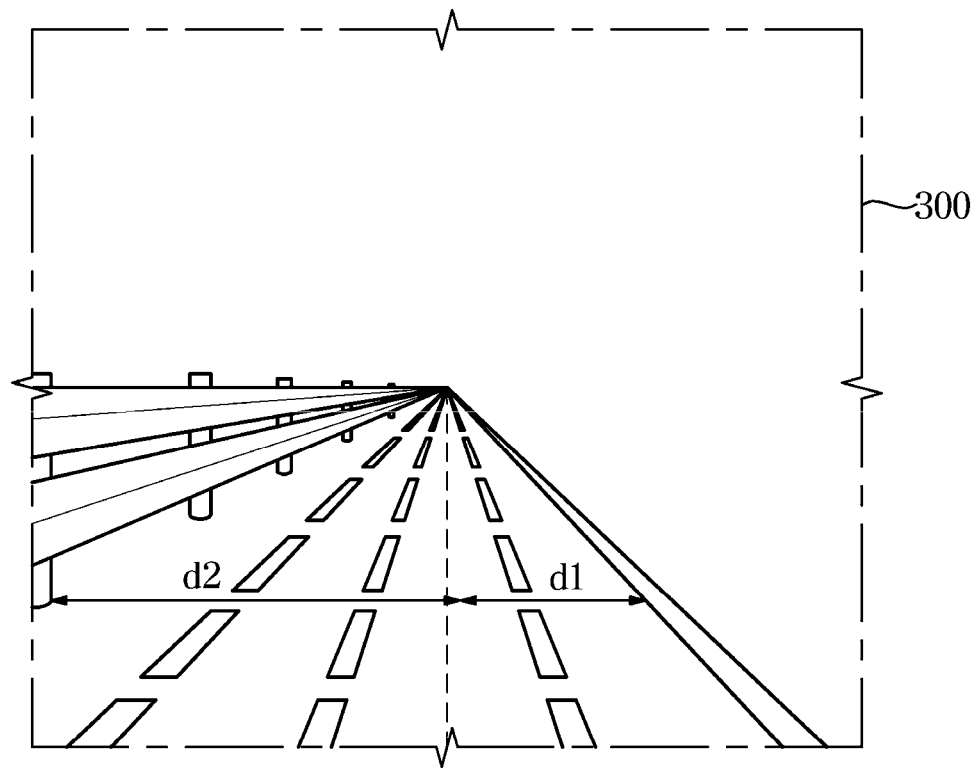
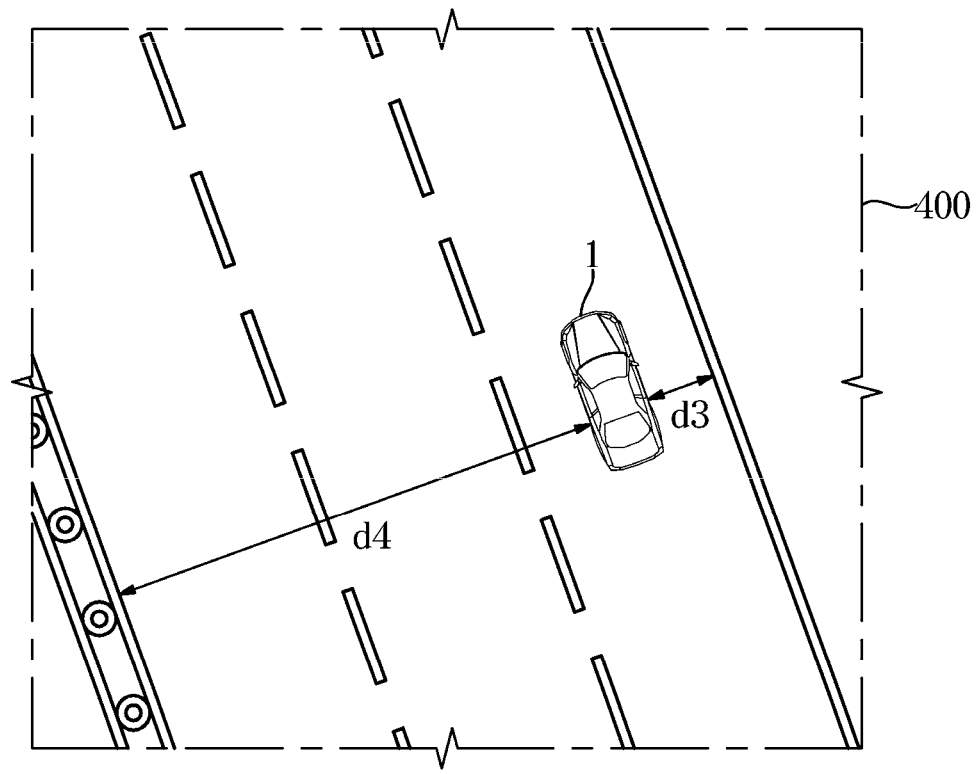

FIG. 7
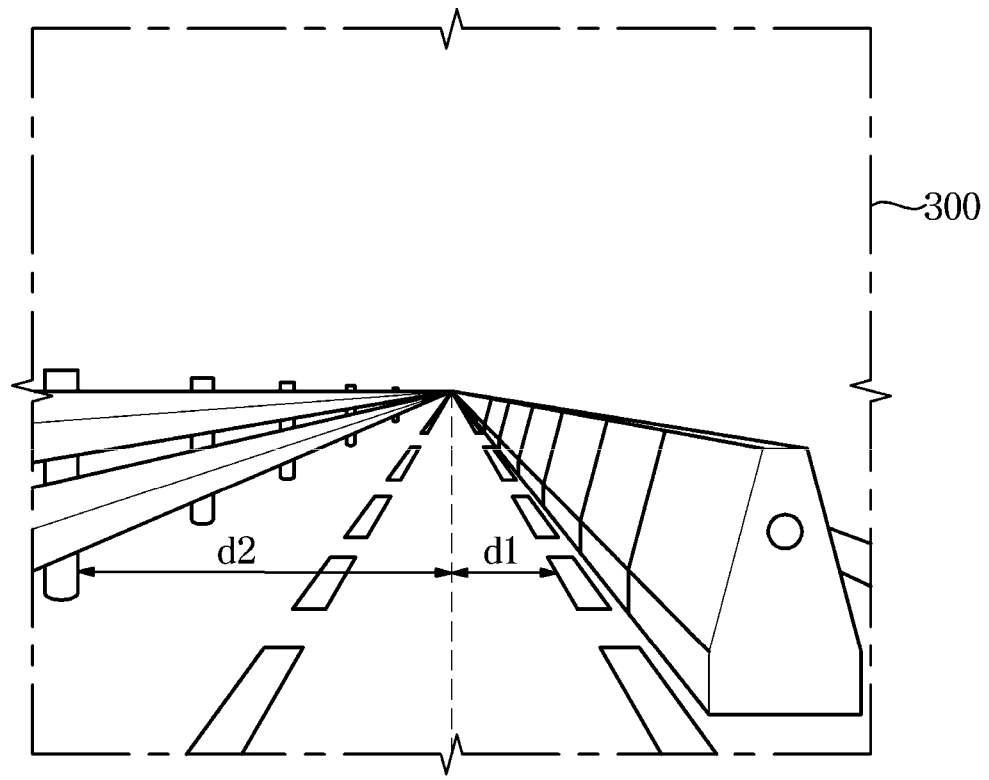
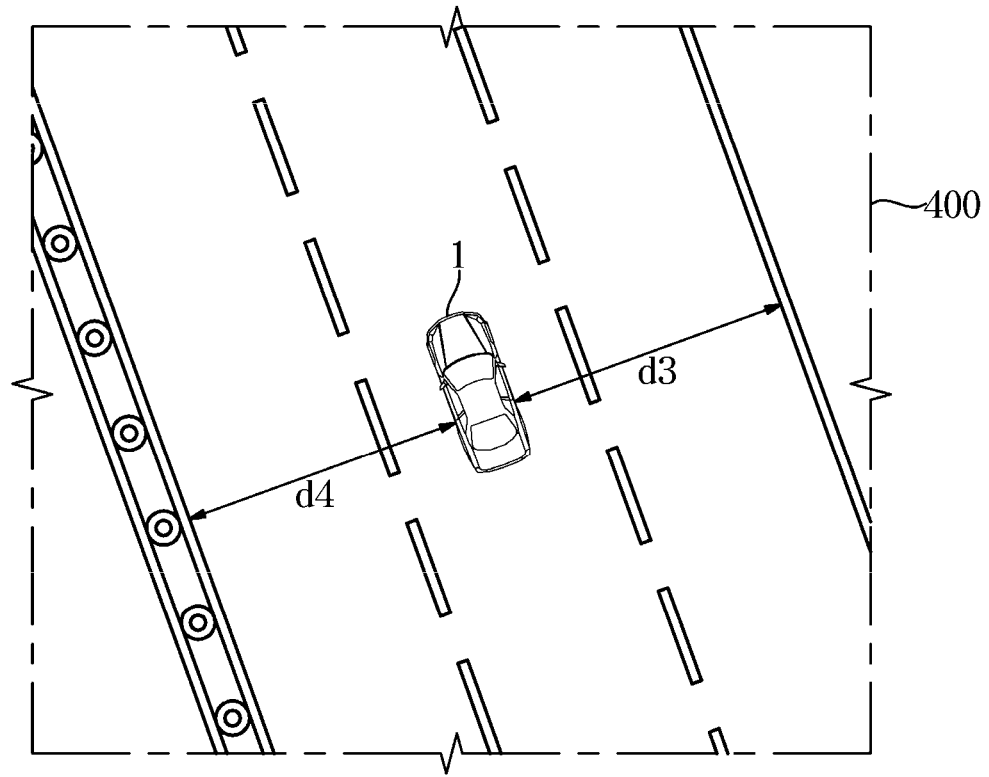

FIG. 8
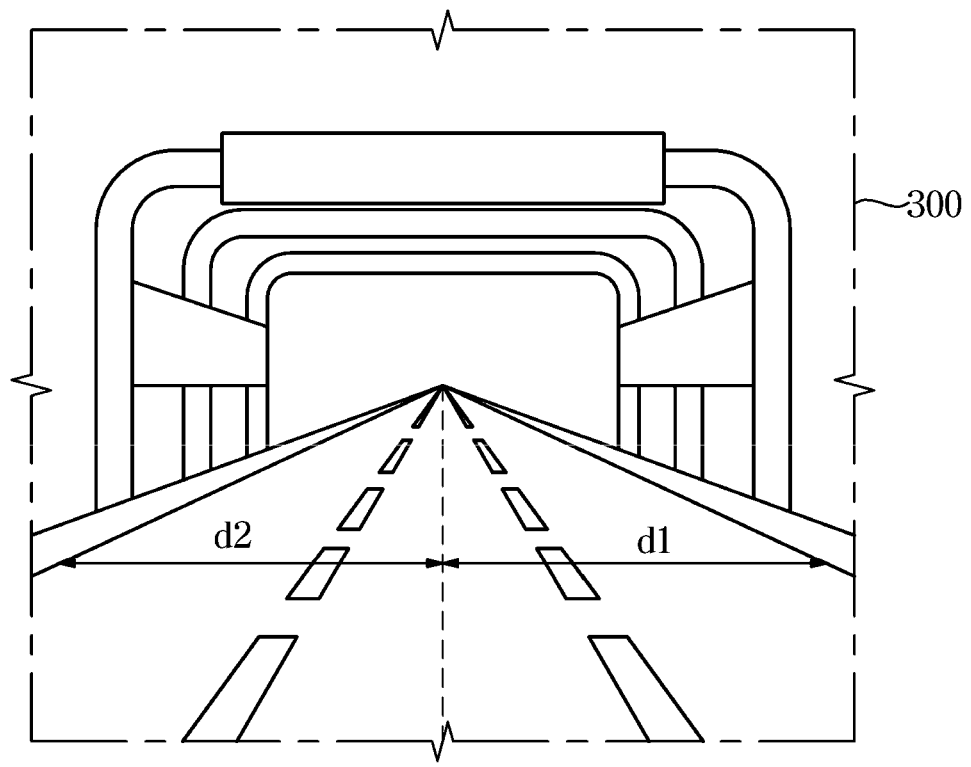
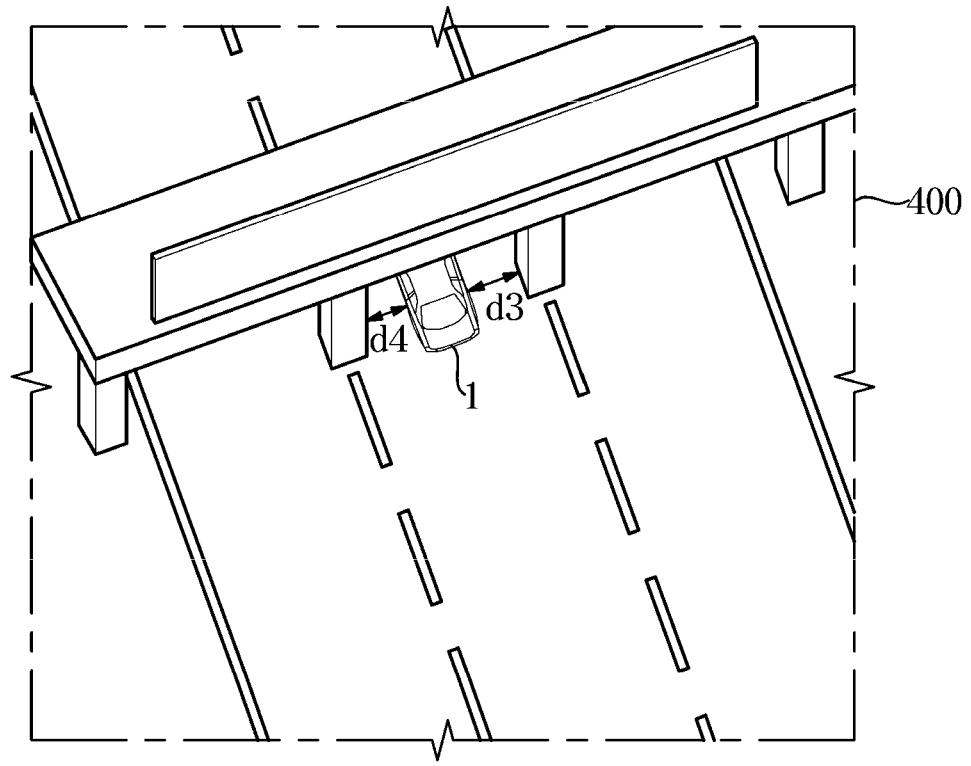

AUTONOMOUS DRIVING SYSTEM AND AUTONOMOUS DRIVING METHOD

CROSS-REFERENCE TO RELATED APPLICATION(S)

This application is based on and claims priority under 35 U.S.C. § 119 to Korean Patent Application No. 10-2020-0109296, filed on Aug. 28, 2020 in the Korean Intellectual Property Office, the disclosure of which is incorporated herein by reference in its entirety.

TECHNICAL FIELD

The disclosure relates to an autonomous driving system and method, and more particularly, to an autonomous driving system and an autonomous driving method capable of determining an error of a high definition map.

BACKGROUND

A vehicle refers to an apparatus capable of transporting people or goods to a destination while traveling on a road or a track. The vehicle may move to multiple locations mainly by using one or more wheels provided with a vehicle body. Such a vehicle may include a three-wheeled vehicle or a four-wheeled vehicle, a vehicle with two wheels such as a motorcycle, a construction machine, a bicycle, and a train running on rails disposed on a track.

Recently, to reduce a burden on a driver and increase a convenience, research on a vehicle equipped with an advanced driver assist system (ADAS) that dynamically provides information on a vehicle condition, a driver condition, and surrounding environments is being actively conducted, and research on an autonomous driving system using an ADAS is being actively conducted as well.

As an ADAS installed on a vehicle is advanced, a high-precision map has been utilized as an essential element of an autonomous driving system.

However, when an error in a high-precision map is present, it may cause a serious malfunction of an autonomous driving system.

SUMMARY

Therefore, it is an aspect of the disclosure to provide an autonomous driving system and an autonomous driving method capable of determining an error of a high definition map in consideration of an actual road situation.

Additional aspects of the disclosure will be set forth in part in the description which follows and, in part, will be obvious from the description, or may be learned by practice of the disclosure.

In accordance with an aspect of the present disclosure, an autonomous driving system includes a first sensor installed in a vehicle, having a field of view facing in front of the vehicle, and configured to acquire front image data; a second sensor selected from the group consisting of a radar and a light detection and ranging (lidar), installed in the vehicle, having a detection field of view facing in front of the vehicle, and configured to acquire forward detection data; a communicator configured to receive a high definition map at a current location of the vehicle from an external server; and a controller including a processor configured to process the high definition map, the front image data, and the forward detection data; wherein the controller is configured to calculate a first distance between the vehicle and a right road boundary line and a second distance between the vehicle and a left road boundary line in response to processing the front image data and the forward detection data, calculate a third distance between the vehicle and the right road boundary line and a fourth distance between the vehicle and the left road boundary line in response to processing the high definition map, and determine a map quality index of the high definition map based on the first distance, the second distance, the third distance, and the fourth distance, and determine an error of the high definition map based on the map quality index.

The controller may be configured to determine that the error of the high definition map being present when the map quality index is less than or equal to a predetermined threshold value.

The controller may be configured to reduce the map quality index when a root mean square error (RMSE) between the first distance and the third distance is greater than or equal to a predetermined first value.

The controller may be configured to improve the map quality index when the RMSE between the first distance and the third distance is less than or equal to a predetermined second value that is smaller than the predetermined first value.

The controller may be configured to reduce the map quality index when a RMSE between the second distance and the fourth distance is greater than or equal to a predetermined first value.

The controller may be configured to improve the map quality index when the RMSE between the second distance and the fourth distance is less than or equal to a predetermined second value that is smaller than the predetermined first value.

The controller may be configured to reduce the map quality index when a color or a shape of a lane detected in response to processing the front image data and the forward detection data and a color or a shape of a lane acquired in response to processing the high definition map are different.

The controller may be configured to determine coordinates of the vehicle on the high definition map such that a sum of a RMSE between the first distance and the third distance and a RMSE between the second distance and the fourth distance is minimized.

The controller may be configured to transfer a control right of the vehicle to a driver when it is determined that the error of the high definition map being present.

The controller may be configured to control the communicator to transmit at least one of the front image data and the forward detection data to the server when it is determined that the error of the high definition map being present.

In accordance with another aspect of the present disclosure, an autonomous driving method includes steps of acquiring front image data from a front camera installed in a vehicle and having a field of view facing in front of the vehicle; receiving, by a communicator, a high definition map at a current location of the vehicle from an external server; calculating, by a controller, a first distance between the vehicle and a right road boundary line and a second distance between the vehicle and a left road boundary line in response to processing the front image data; calculating, by the controller, a third distance between the vehicle and the right road boundary line and a fourth distance between the vehicle and the left road boundary line in response to processing the high definition map; determining, by the controller, a map quality index of the high definition map based on the first distance, the second distance, the third distance, and the fourth distance; and determining an error of the high definition map based on the map quality index.

The step of determining the error may include determining that the error of the high definition map being present when the map quality index is less than or equal to a predetermined threshold value.

The step of determining the map quality index may include reducing the map quality index when a root mean square error (RMSE) between the first distance and the third distance is greater than or equal to a predetermined first value.

The step of determining the map quality index may include improving the map quality index when the RMSE between the first distance and the third distance is less than or equal to a predetermined second value that is smaller than the predetermined first value.

The step of determining the map quality index may include reducing the map quality index when a RMSE between the second distance and the fourth distance is greater than or equal to a predetermined first value.

The step of determining the map quality index may include improving the map quality index when the RMSE between the second distance and the fourth distance is less than or equal to a predetermined second value that is smaller than the predetermined first value.

The method may further include a step of reducing the map quality index when a color or a shape of a lane detected in response to processing the front image data and a color or a shape of a lane acquired in response to processing the high definition map are different.

The method may further include a step of determining coordinates of the vehicle on the high definition map such that a sum of a RMSE between the first distance and the third distance and a RMSE between the second distance and the fourth distance is minimized.

The method may further include a step of transferring a control right of the vehicle to a driver when it is determined that the error of the high definition map being present.

The method may further include a step of controlling the communicator to transmit the front image data to the server when it is determined that the error of the high definition map being present.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 6 to 10 are views illustrating a situation in which it may be determined that an error of a high-precision map being present.

DETAILED DESCRIPTION

Figure 1:
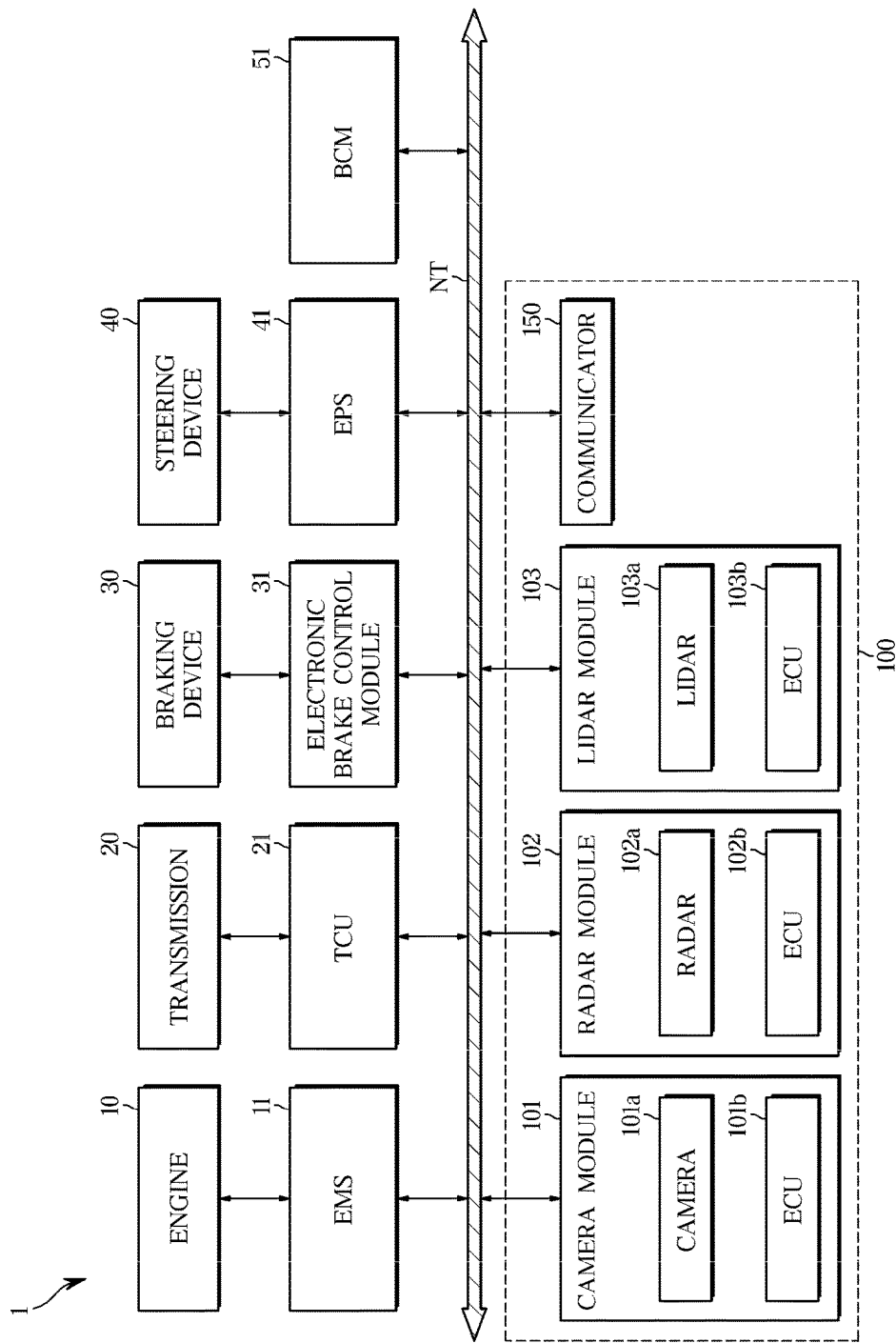
FIG. 1 is a diagram showing a configuration of a vehicle according to an exemplary embodiment.

Reference will now be made in detail to the embodiments of the present disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

FIG. 1 is a diagram showing a configuration of a vehicle according to an exemplary embodiment.

As shown in FIG. 1, a vehicle 1 includes an engine 10, a transmission 20, a braking device 30, and a steering device 40. The engine 10 includes a cylinder and a piston, and may generate power for driving the vehicle 1. The transmission 20 includes a plurality of gears, and may transmit power generated by the engine 10 to wheels of the vehicle. The braking device 30 may decelerate the vehicle 1 or stop the vehicle 1 through a friction with the wheels. The steering device 40 may change a traveling direction of the vehicle 1.

The vehicle 1 may include a plurality of electrical components. For example, the vehicle 1 includes an engine management system (EMS) 11, a transmission control unit (TCU) 21, an electronic brake control module 31, an electronic power steering (EPS) 41, a body control module (BCM), and an autonomous driving system 100.

The EMS 11 may control the engine 10 in response to a driver's will to accelerate through an accelerator pedal or a request from the autonomous driving system 100. For example, the EMS 11 may control a torque of the engine 10.

The TCU 21 may control the transmission 20 in response to a driver's shift instruction through a shift lever and/or a driving speed of the vehicle 1. For example, the TCU 21 may adjust a shift ratio from the engine 10 to the wheels.

The electronic brake control module 31 may control the braking device 30 in response to a driver's will to brake through a brake pedal and/or a slip of the wheels. For example, the electronic brake control module 31 may temporarily release the brake of the wheels in response to the slip of the wheels detected when the vehicle 1 is braking (also referred to as anti-lock braking systems (ABS)). The electronic brake control module 31 may selectively release the brake of the wheels in response to oversteering and/or understeering detected when the vehicle 1 is steered (also referred to as an electronic stability control (ESC)). Furthermore, the electronic brake control module 31 may temporarily brake the wheels in response to the slip of the wheels detected when the vehicle 1 is driven (also referred to as a traction control system (TCS)).

The EPS 41 may assist an operation of the steering device 40 so that the driver may easily manipulate a steering wheel in response to a driver's will to steer through the steering wheel. For example, the EPS 41 may assist the operation of the steering device 40 to decrease a steering effort during a low-speed driving or a parking and increase the steering effort during a high-speed driving.

The BCM 51 may control operations of electrical components that provide a convenience to the driver or ensure a driver's safety. For example, the BCM 51 may control a head lamp, a wiper, a cluster, multi-function switches, and a direction indicator lamp.

The autonomous driving system 100 may assist the driver to operate (e.g., a driving, a braking, and a steering, and the like) the vehicle 1. For example, the autonomous driving system 100 may detect road environments on which the vehicle 1 is traveling (e.g., other vehicles, a pedestrian, a cyclist, a lane, a road sign, a traffic light, etc.), and control the driving and/or the braking and/or the steering of the vehicle 1 in response to the detected environments.

In another exemplary embodiment, the autonomous driving system 100 may receive a high definition map at a current location of the vehicle from an external server, and control the driving and/or the braking and/or the steering of the vehicle 1 in response to the received high definition map.

The autonomous driving system 100 may provide various functions to the driver. For example, the autonomous driving system 100 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and an inertial driving guidance, and the like.

The autonomous driving system 100 may include a camera module 101 for acquiring image data around the vehicle 1, a radar module 102 for acquiring object data around the vehicle 1, and a light detection and ranging (lidar) module 103 for scanning around the vehicle 1 and detecting an object. The camera module 101 includes a camera 101*a* and an electronic control unit (ECU) 101*b*, and capture a front of the vehicle 1 and identify other vehicles, a pedestrian, a cyclist, a lane, a road sign, a structure, etc. The radar module 102 includes a radar 102*a* and an ECU 102*b*, and may acquire a relative position, a relative speed, etc. of objects (e.g., other vehicles, a pedestrian, a cyclist, a structure, etc.) around the vehicle 1.

The lidar module 103 includes a lidar 103*a* and an ECU 103*b*, and acquire a relative position, a relative speed, etc. of a moving object (e.g., other vehicles, a pedestrian, a cyclist, etc.) around the vehicle 1. Furthermore, the lidar module 103 may acquire a shape and a location of a nearby fixed object (e.g., a building, a sign, a traffic light, a bump, etc.).

Specifically, the lidar module 103 may acquire the shape and location of the fixed object around the vehicle 1 by acquiring point cloud data for an external view of the vehicle 1.

In other words, the autonomous driving system 100 processes the image data acquired from the camera module 101, detection data acquired from the radar module 102, and the point cloud data acquired from the lidar module 103, and may detect the road environments on which the vehicle 1 is traveling, a front object located in front of the vehicle 1, a lateral object located on a side of the vehicle 1, and a rear object located behind the vehicle 1, in response to processing the image data, the detection data, and the point cloud data.

The autonomous driving system 100 is not limited to that shown in FIG. 1, and the lidar module 103 may be substituted for or used together with the radar module 102. The autonomous driving system 100 may include a communicator 150 for receiving a high definition map (also referred to as a high precision map) at the current location of the vehicle 1.

The communicator 150 may be implemented by a communication chip, an antenna, and related components to access a wireless communication network. In other words, the communicator 150 may be implemented as various types of communication modules capable of a long-distance communication with an external server. In other words, the communicator 150 may include a wireless communication module for transmitting and receiving data with the external server in a wireless manner.

The above electrical components may communicate with each other via a communication network for a vehicle (NT). For example, electrical components may transmit and receive to/from data through an Ethernet, a media oriented system transport (MOST), a FlexRay, a controller area network (CAN), and a local interconnect network (LIN), and the like. For example, the autonomous driving system 100 may transmit a driving control signal, a braking signal, and a steering signal through the EMS 11, the electronic brake control module 31, and the EPS 41 through the NT, respectively.

Figure 2:
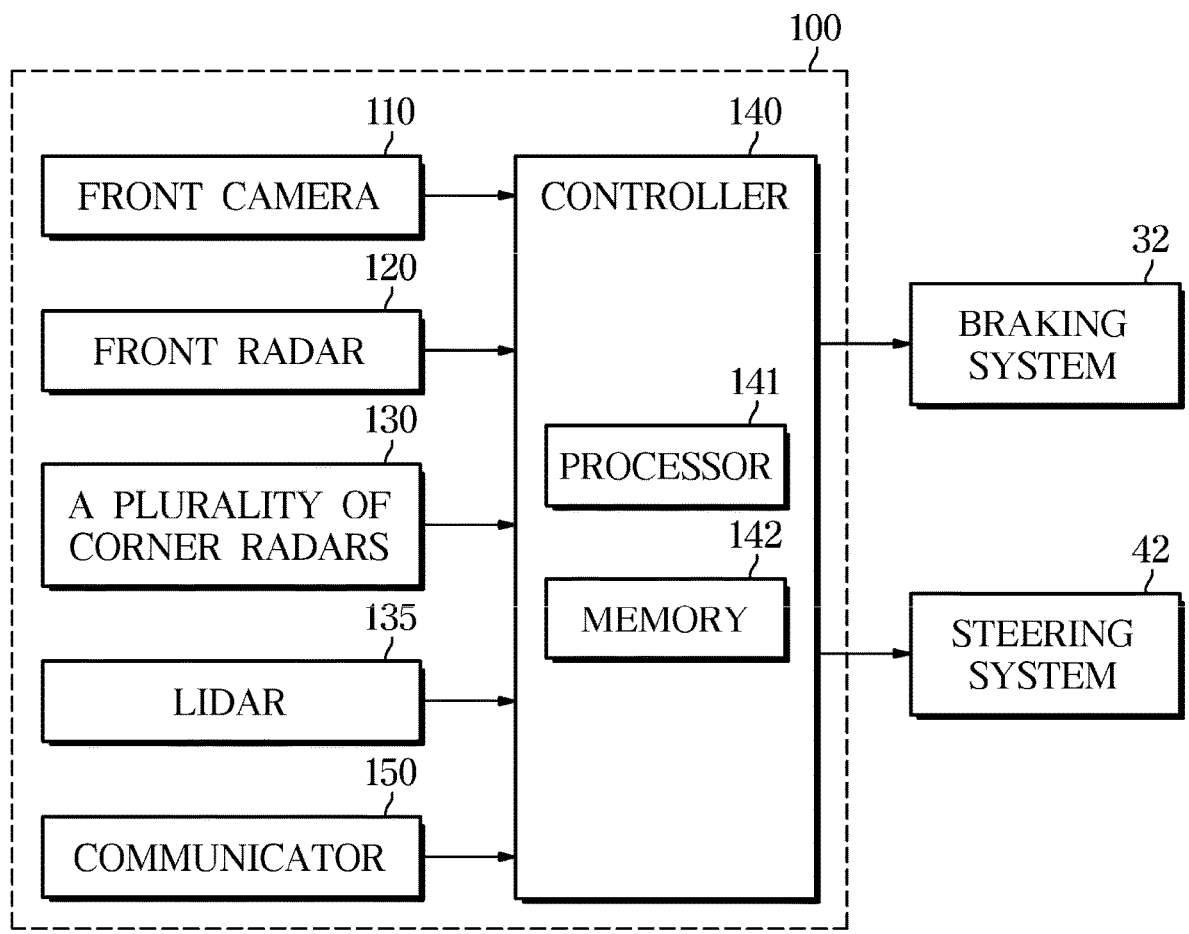
FIG. 2 is a diagram showing a configuration of an autonomous driving system according to an exemplary embodiment.
Figure 3:
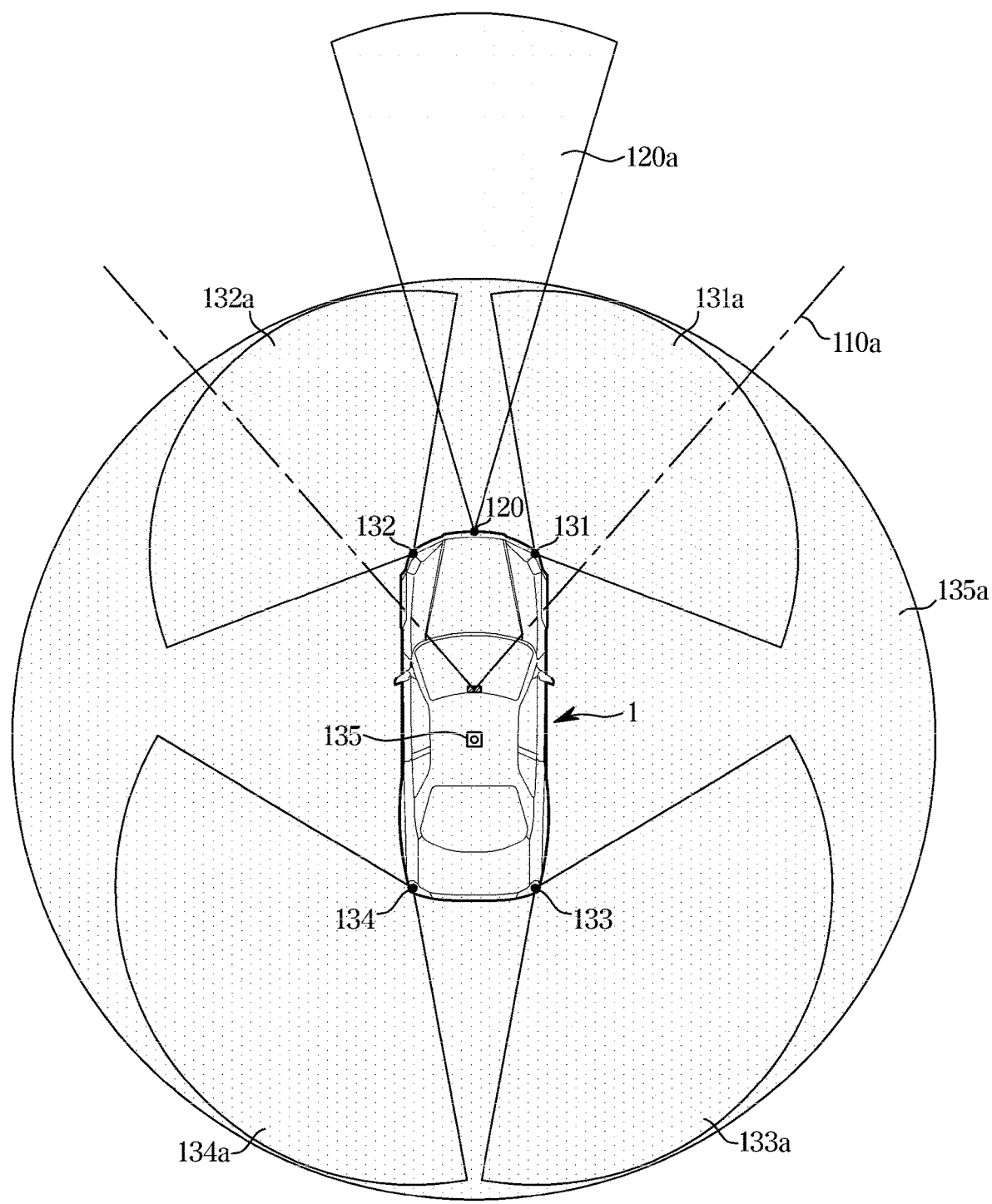
FIG. 3 is a view illustrating cameras and radars included in an autonomous driving system according to an exemplary embodiment.

FIG. 2 is a diagram showing a configuration of an autonomous driving system according to an exemplary embodiment. FIG. 3 is a view illustrating a camera and a radar included in an autonomous driving system according to an exemplary embodiment.

As shown in FIG. 2, the vehicle 1 may include a braking system 32, a steering system 42, and the autonomous driving system 100.

The braking system 32 may include the electronic brake control module 31 (see FIG. 1) and the braking device 30 (see FIG. 1) described in FIG. 1, and the steering system 42 may include the EPS 41 (see FIG. 1). 1) and the steering device 40 (see to FIG. 1).

The braking system 32 and the steering system 42 may control the vehicle 1 so that the vehicle 1 performs autonomous driving based on a control signal of the autonomous driving system 100.

The autonomous driving system 100 may include a front camera 110, a front radar 120, a plurality of corner radars 130, a lidar 135, and the communicator 150.

The front camera 110 may have a field of view 110*a* facing in front of the vehicle 1 as shown in FIG. 3. The front camera 110 may be installed, for example, on a front windshield of the vehicle 1, but may be provided at any position without limitation as long as it has the field of view facing in front of the vehicle 1.

The front camera 110 may capture the front of the vehicle 1 and acquire image data of the front of the vehicle 1. The image data of the front of the vehicle 1 may include a position with respect to a road boundary line located in front of the vehicle 1.

The front camera 110 may include a plurality of lenses and an image sensors. The image sensors may include a plurality of photodiodes that convert light into an electrical signal, and the plurality of photodiodes may be arranged in a two-dimensional matrix.

The front camera 110 may be electrically connected to the controller 140. For example, the front camera 110 may be connected to the controller 140 through one of the NT, a hard wire, or a printed circuit board (PCB).

The front camera 110 may transmit the image data of the front of the vehicle 1 (hereinafter referred to as front image data) to the controller 140.

The front radar 120 may have a field of sensing 120a toward the front of the vehicle 1 as shown in FIG. 3. The front radar 120 may be installed, for example, on a grille or a bumper of the vehicle 1.

The front radar 120 may include a transmission antenna (or a transmission antenna array) that radiates a transmitted wave toward the front of the vehicle 1, and a reception antenna (or a reception antenna array) that receives a reflected wave reflected by an object. The front radar 120 may acquire forward detection data from the transmitted wave transmitted by the transmission antenna and the reflected wave received by the reception antenna. The forward detection data may include distance information and a degree of speed about other vehicles or a pedestrian or a cyclist located in front of the vehicle 1. The front radar 120 may calculate a state distance to the object based on a phase difference (or a time difference) between the transmitted wave and the reflected wave, and calculate the relative speed of the object based on a frequency difference between the transmitted wave and the reflected wave.

The front radar 120 may be connected to the controller 140 through one of the NT, the hard wire, or the PCB. The front radar 120 may transmit forward detection data (hereinafter referred to as forward detection data) to the controller 140.

The plurality of corner radars 130 include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

The first corner radar 131 may have a detection field of view 131a facing the front right side of the vehicle 1 as shown in FIG. 3. The front radar 120 may be installed, for example, on a right side of a front bumper of the vehicle 1. The second corner radar 132 may have a detection field of view 132a facing the front left side of the vehicle 1, and may be installed on a left side of the front bumper of the vehicle 1. The third corner radar 133 may have a detection field of view 133a facing the rear right of the vehicle 1, and may be installed, for example, on a right side of a rear bumper of the vehicle 1. The fourth corner radar 134 may have a detection field of view 134a facing the rear left of the vehicle 1, and may be installed, for example, on a left side of the rear bumper of the vehicle 1.

Each of the first, second, third, and fourth corner radars 131, 132, 133, and 134 may include a transmission antenna and a reception antenna, respectively. The first, second, third, and fourth corner radars 131, 132, 133, and 134 may acquire first corner detection data, second corner detection data, third corner detection data, and fourth corner detection data, respectively. The first corner detection data may include distance information and a degree of speed about other vehicles or a pedestrian or a cyclist or a structure (hereinafter referred to as an object) located on the right front side of the vehicle 1. The second corner detection data may include distance information and a degree of speed the object located on the front left side of the vehicle 1. The third and fourth corner detection data may include distance information and relative speeds of the objects located on the rear right side of the vehicle 1 and the rear left side of the vehicle 1, respectively.

Each of the first, second, third and fourth corner radars 131, 132, 133, and 134 may be connected to the controller 140 through, for example, one of the NT, the hard wire, or the PCB, respectively. The first, second, third, and fourth corner radars 131, 132, 133, and 134 may transmit the first, second, third, and fourth corner detection data to the controller 140, respectively.

The lidar 135 may acquire a relative position, a relative speed, etc. of a moving object (e.g., other vehicles, a pedestrian, a cyclist, etc.) in the vicinity of the vehicle 1. Furthermore, the lidar 135 may acquire a shape and a location of a nearby fixed object (e.g., a building, a sign, a traffic light, a bump, etc.). The lidar 135 may be installed in the vehicle 1 to have an external field of view 135a of the vehicle 1, and may acquire point cloud data for the external field of view 135a of the vehicle 1.

For example, the lidar 135 may be provided an exterior of the vehicle 1 to have the external field of view 135a of the vehicle 1 as shown in FIG. 3, and more specifically may be provided on a loop of the vehicle 1.

The lidar 135 includes a light emitter emitting light, a light receiver configured to receive light in a predetermined direction among reflected light when the light emitted from the light emitter is reflected from an obstacle, and a PCB to which the light emitter and the light receiver are fixed. In this case, the PCB may be provided on a support plate rotated by a rotation driver, so that the PCB may rotate 360 degrees in a clockwise or counterclockwise direction.

In other words, the support plate may rotate about an axis thereof according to power transmitted from the rotation driver, and the light emitter and the light receiver are fixed to the PCB and provided rotatably 360 degrees clockwise or counterclockwise along with the rotation of the PCB. Accordingly, the lidar 135 may detect the object from all directions 135a by emitting and receiving light at 360 degrees.

The light emitter is a component that emits light (e.g., an infrared laser), and may be provided in a single or a plural according to exemplary embodiment.

When the light emitted from the light emitter is reflected from the obstacle, the light receiver is provided to receive light in a predetermined direction among the reflected light. An output signal generated by receiving light by the light receiver may be provided to an object detection process of the controller 140.

The light receiver may include a condensing lens for condensing the received light and an optical sensor for detecting the received light. According to an embodiment, the light receiver may include an amplifier for amplifying the light detected by the optical sensor.

The lidar 135 may receive data on numerous points on external surfaces of the object, and may acquire point cloud data, which is a group of data for these points.

The controller 140 may include the ECU 101b (see FIG. 1) of the camera module 101 (see FIG. 1) and/or the ECU 102b (see FIG. 1) of the radar module 102 (see FIG. 1) and/or the ECU 103b (see FIG. 1) of the lidar module 103 and/or a separate integrated ECU.

Hereinafter, for a convenience of description, it is assumed that the forward sensing data acquired from the front radar 120 may be substituted or used interchangeably the point cloud data acquired from the lidar 135. In other words, the forward detection data acquired from the front radar 120 may refer to the point cloud data for the front of the vehicle 1 acquired from the lidar 135.

The controller 140 may include a processor 141 and a memory 142.

The processor 141 processes the front image data of the front camera 110 and the forward detection data of the front radar 120, and generates the braking signal and the steering signal for controlling the braking system 32 and the steering system 42, respectively. Furthermore, the processor 141 may calculate a distance between the vehicle 1 and a right road boundary line (hereinafter referred to as a first distance) and a distance between the vehicle 1 and a left road boundary line (hereinafter referred to as a second distance) in response to processing the front image data of the front camera 110 and the forward detection data of the front radar 120.

As a method of calculating the first distance and the second distance, a conventional image data processing technique and/or a radar/lidar data processing technique may be used.

The processor 141 may process the front image data of the front camera 110 and the forward detection data of the front radar 120, and detect the objects (e.g., a lane and a structure) in front of the vehicle 1 in response to processing the front image data and the forward detection data.

Particularly, the processor 141 may acquire the positions (distances and directions) and relative speeds of the objects in front of the vehicle 1 based on the forward detection data acquired by the front radar 120. The processor 141 may acquire the positions (directions) and type information (e.g., whether the object is another vehicle, a structure, etc.) of the objects in front of the vehicle 1 based on the front image data of the front camera 110. Furthermore, the processor 141 may match the objects detected by the front image data to the objects detected by the forward detection data, and acquire type information, the positions, and the relative speeds of the objects in front of the vehicle 1 based on the matching result.

Furthermore, as described above, the processor 141 may acquire information related to the road environments on which the vehicle 1 is traveling, information related to the front object, and calculate the distance between the vehicle 1 and the right road boundary line and the distance between the vehicle 1 and the left road boundary line.

The road boundary line may refer to a boundary line of structures such as guard rails through which the vehicle 1 may not physically pass, opposite ends of a tunnel, artificial walls, etc., and also may refer to a center line through which the vehicle 1 may not pass in principle, but it is not limited thereto.

The processor 141 may process the high definition map received from the communicator 150, and in response to processing the high definition map calculate a distance between the vehicle 1 and the right road boundary line (hereinafter referred to as a third distance) and a distance between the vehicle 1 and the left road boundary line (hereinafter referred to as a fourth distance).

Particularly, the processor 141 may receive the high definition map at the current location of the vehicle 1 based on the current location of the vehicle 1 obtained from a global positioning system (GPS), and determine a location of the vehicle 1 on the high definition map based on the front image data and the forward sensing data.

For example, the processor 141 may determine a road on which the vehicle 1 is traveling on the high definition map based on location information of the vehicle 1 obtained from the GPS, and determine a traveling lane on which the vehicle 1 is traveling based on the front image data and the forward detection data. In other words, the processor 141 may determine coordinates of the vehicle on the high definition map.

For example, the processor 141 may determine the number of left lanes in response to processing the front image data and the forward detection data, and based on the determined number of left lanes determine a position of the lane on which the vehicle is traveling on the high definition map, thereby specifically determining the coordinates of the vehicle 1 on the high definition map. However, the method of determining the coordinates of the vehicle 1 on the high definition map is not limited thereto.

In other words, the processor 141 may determine the coordinates of the vehicle 1 on the high definition map based on the number of right lanes detected based on the front image data and the forward detection data, and based on the first and second distances calculated based on the front image data and the forward detection data, determine the coordinates of the vehicle 1 on the high definition map.

To this end, the processor 141 may include an image processor that processes the front image data and high definition map data of the front camera 110 and/or a digital signal processor that processes the detection data of the front radar 120 and/or a micro control unit (MCU) or a domain control unit (DCU) that generates a control signal for controlling the braking system 32 and the steering system 42.

The memory 142 may store a program and/or data for the processor 141 to process image data such as the front image data and the high definition map data, a program and/or data for processing the detection data, and a program and/or data for generating the braking signal and/or the steering signal.

The memory 142 may temporarily store the image data received from the front camera 110 and/or the detection data received from the radar 120 and the high definition map received from the communicator 150, and also temporarily store the result of processing the image data and/or the detection data of the processor 141.

Furthermore, the memory 142 may permanently or semi-permanently store the image data received from the front camera 110 and/or the detection data received from the radars 120 and 130 and/or the high definition map received from the communicator 150 corresponding to a signal from the processor 141.

To this end, the memory 142 may include not only a volatile memory such as a static random access memory (SRAM) and a dynamic random access memory (DRAM), but also a non-volatile memory such as a flash memory, a read-only memory (ROM), and an erasable programmable read-only memory (EPROM).

As described above, the radars 120 and 130 may be substituted or used interchangeably the lidar 135 that scans in the vicinity of the vehicle 1 and detects the object.

As described above, each component included in the vehicle 1 has been described in detail. Hereinafter, a process in which the controller 140 determines an error of the high definition map will be described in detail with reference to FIGS. 4 to 10.

Figure 4:
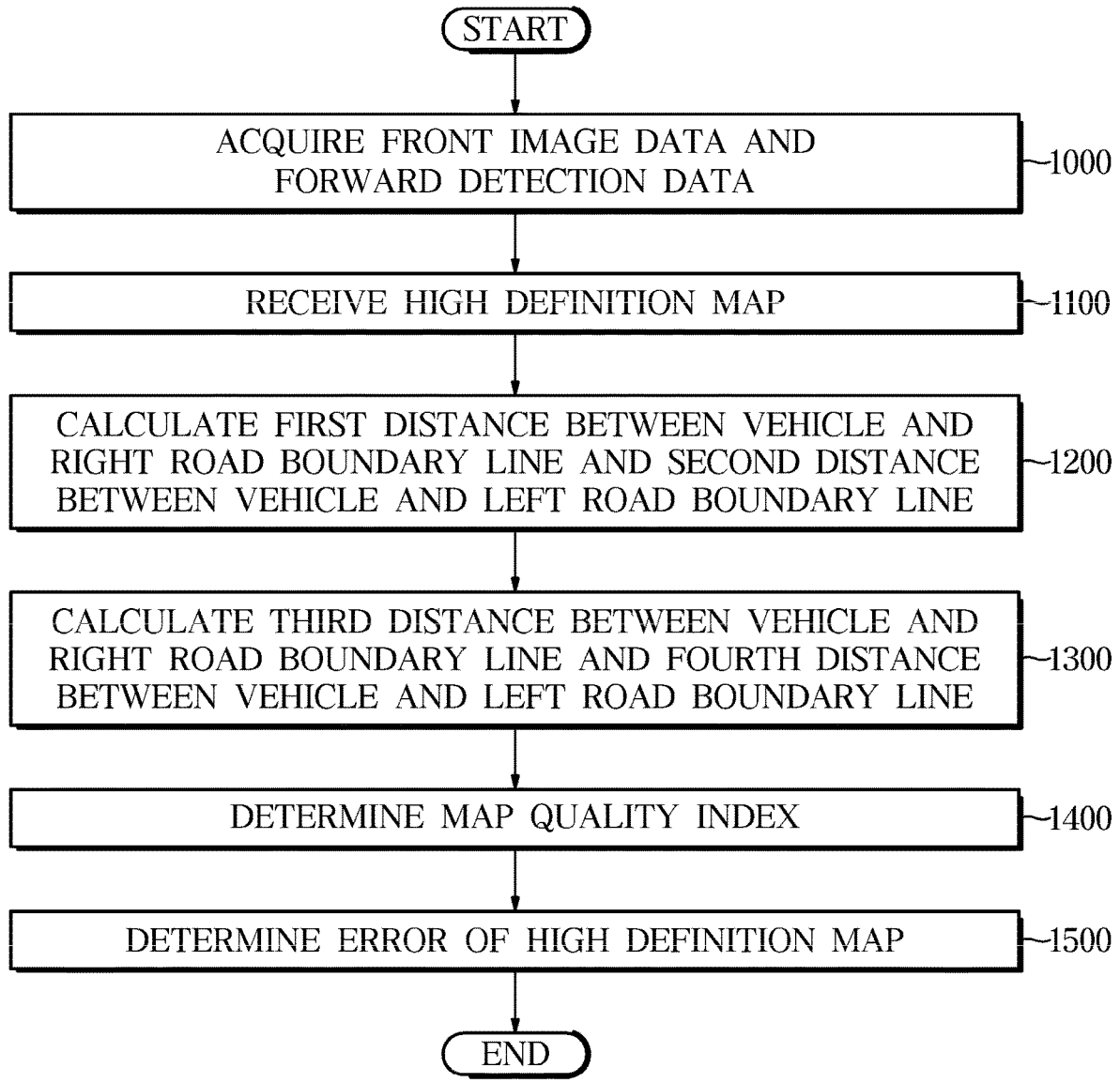
FIG. 4 is a flowchart of an autonomous driving method according to an exemplary embodiment.
Figure 5:
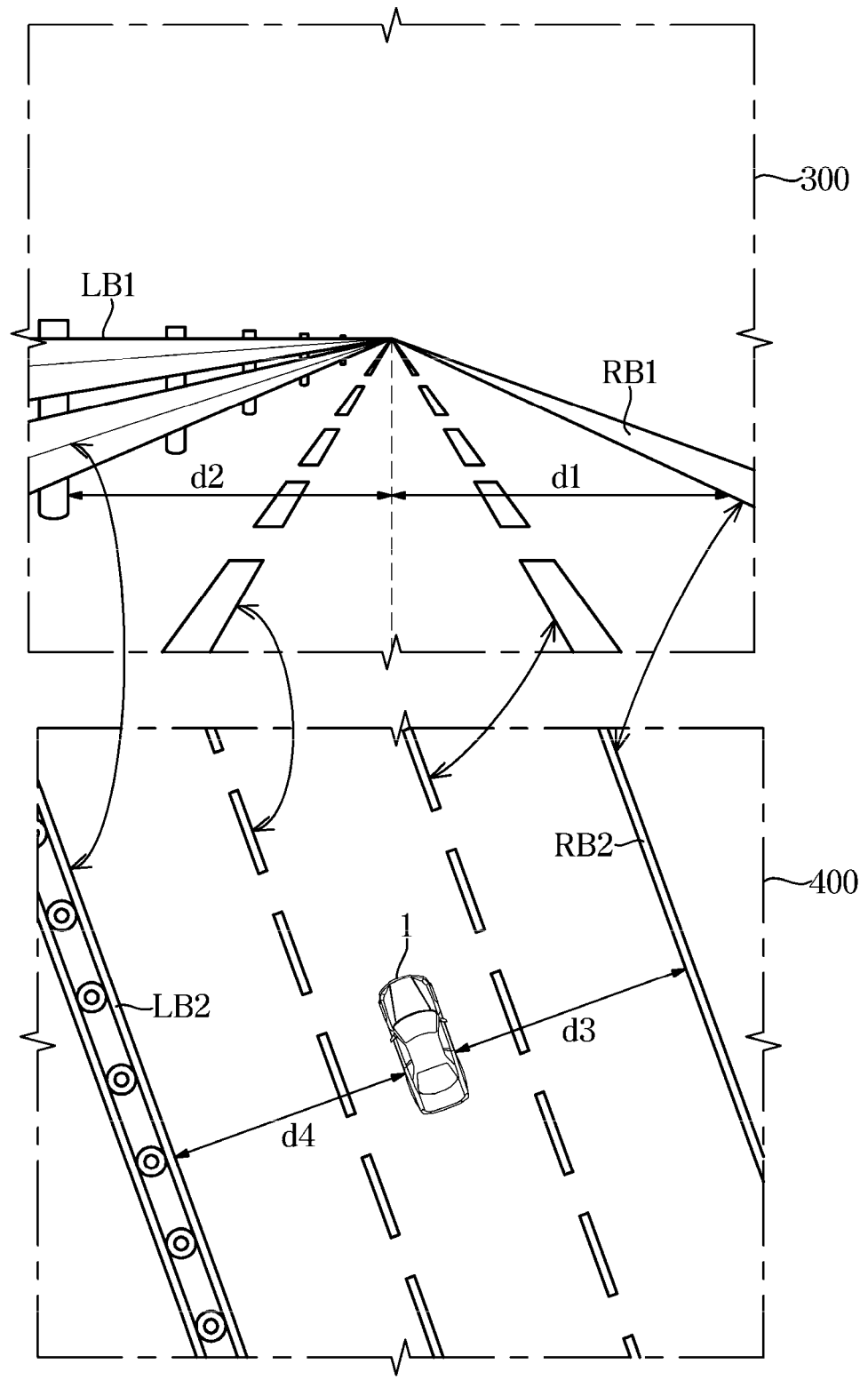
FIG. 5 is a view illustrating front image data and a high definition map acquired by an autonomous driving system according to an exemplary embodiment.

FIG. 4 is a flowchart of an autonomous driving method according to an exemplary embodiment, FIG. 5 is a view illustrating front image data and a high definition map acquired by the autonomous driving system according to an exemplary embodiment, and FIGS. 6 to 10 are views showing a situation in which it may be determined that an error of the high definition map being present.

Referring to FIG. 4, according to an exemplary embodiment, the front camera may acquire the front image data, the front radar and/or lidar may acquire the forward detection data, and the controller 140 may receive the front image data and the forward detection data from the front camera and the front radar (1000).

The communicator 150, according to an exemplary embodiment, may receive the high definition map at the current location of the vehicle 1 from a cloud server, and the controller 140 may receive the high definition map from the communicator 150 (1100). In particular, the communicator 150 may transmit the current location of the vehicle 1 detected from the GPS to the cloud server, and the cloud server may transmit the high definition map based on the current location of the vehicle 1 to the communicator 150.

The controller 140 may process the front image data acquired from the front camera 110 and the forward detection data acquired from the front radar 120, and in response to processing the front image data and the forward detection data calculate the first distance between the vehicle 1 and the right road boundary line and the second distance between the vehicle 1 and the left road boundary line (1200).

Furthermore, the controller 140 may calculate the third distance between the vehicle 1 and the right road boundary line and the fourth distance between the vehicle 1 and the left road boundary line, in response to processing the high definition map (1300).

Referring to FIG. 5, the front image data 300 and the high definition map 400 may be identified. As described above, the controller 140 may determine the coordinates of the vehicle 1 on the high definition map 400. For example, the controller 140 may determine the coordinates of the vehicle 1 on the high definition map 400 as a center of a second lane based on the number of left lanes detected from the front image data 300 being one.

Thereafter, the controller 140 may match a right road boundary line RB1 and a left road boundary line LB1, which are detected by processing the front image data 300 and the forward detection data, and a right road boundary line RB2 and a left road boundary line LB2, which are detected by processing the high definition map 400.

The controller 140 may calculate a first distance d1 and a second distance d2 based on the front image data 300 and the forward detection data, and calculate a third distance d3 and a fourth distance d4 based on the high definition map 400.

The controller 140 may determine a map quality index of the high definition map 400 based on the first distance d1, the second distance d2, the third distance d3, and the fourth distance d4 (1400).

In particular, when a root mean square error (RMSE) between the first distance d1 and the third distance d3 is greater than or equal to a predetermined first value, the controller 140 may reduce the map quality index, and When the RMSE between the first distance d1 and the third distance d3 is less than or equal to a predetermined second value that is smaller than the predetermined first value, the map quality index may be improved. In this case, the predetermined first value may be set to a width of the vehicle 1, but is not limited thereto.

Furthermore, when a RMSE between the second distance d2 and the fourth distance d4 is greater than or equal to a predetermined first value, the controller 140 may reduce the map quality index, and when the RMSE between the second distance d2 and the fourth distance d4 is less than or equal to a predetermined second value that is smaller than the predetermined first value, the map quality index may be improved.

In this case, the controller 140 may correct the coordinates of the vehicle 1 on the high definition map 400 such that the sum of the RMSE between the first distance d1 and the third distance d3 and the RMSE between the second distance d2 and the fourth distance d4 is minimized.

In other words, to avoid a situation in which the RMSE between the first distance d1 and the third distance d3 and the RMSE between the second distance d2 and the fourth distance d4 become large due to the coordinates being determined incorrectly on the high definition map 400, the controller 140 may determine the coordinates of the vehicle 1 on the high definition map 400 such that the sum of the RMSE between the first distance d1 and the third distance d3, and the RMSE between the second distance d2 and the fourth distance d4 is minimized.

When the RMSE between the first distance d1 and the third distance d3 and/or the RMSE between the second distance d2 and the fourth distance d4 is less than or equal to the predetermined second value by correcting the coordinates of the vehicle 1 on the high definition map 400, the controller 140 may improve the map quality index of the high definition map, thereby compensating the map quality index.

However, even when the coordinates of the vehicle 1 on the high definition map 400 are corrected, the RMSE between the first distance d1 and the third distance d3 and/or the RMSE between the second distance d2 and the fourth distance d2 is greater than or equal to the predetermined first value, the controller 140 may reduce the map quality index of the high definition map, thereby decreasing the map quality index to be less than or equal to a threshold value.

Thereafter, the controller 140 may determine an error of the high definition map based on the map quality index (1500).

For example, when the map quality index is less than or equal to the predetermined threshold value, the controller 140 may determine that the error of the high definition map being present.

Referring to FIG. 6, it may be identified that the number of lanes based on the front image data 300 is four and the number of lanes based on the high definition map 400 is three.

In the situation shown in FIG. 6, the controller 140 may determine the coordinates of the vehicle 1 on the high definition map 400 as the rightmost lane based on the number of left lanes.

Thereafter, when it is determined that the RMSE between the first distance d1 and the third distance d3 is greater than or equal to the predetermined first value, the controller 140 may correct the coordinates of the vehicle 1 on the high definition map 400 such that the sum of the RMSE between the first distance d1 and the third distance d3 and the RMSE between the second distance d2 and the fourth distance d4 is minimized.

Nevertheless, when it is determined that the RMSE between the first distance d1 and the third distance d3 or the RMSE between the second distance d2 and the fourth distance d4 is greater than or equal to the predetermined first value, the map quality index of the high definition map 400 may be reduced.

Therefore, the autonomous driving system 100 according to an exemplary embodiment may easily determine the error of the high definition map when information regarding that lanes of a road have been increased due to an expansion of a road is not reflected in the high definition map.

Referring to FIG. 7, it may be identified that the number of available lanes based on the front image data 300 is two and the number of available lanes based on the high definition map 400 is three.

In the situation shown in FIG. 7, the controller 140 may determine the coordinates of the vehicle 1 on the high definition map 400 as a middle lane based on the number of left lanes.

Thereafter, when it is determined that the RMSE between the first distance d1 and the third distance d3 is greater than or equal to the predetermined first value, the controller 140 may correct the coordinates of the vehicle 1 on the high definition map 400 such that the sum of the RMSE between the first distance d1 and the third distance d3 and the RMSE between the second distance d2 and the fourth distance d4 is minimized.

Nevertheless, when it is determined that the RMSE between the first distance d1 and the third distance d3 or the RMSE between the second distance d2 and the fourth distance d4 is greater than or equal to the predetermined first value, the map quality index of the high definition map 400 may be reduced.

Therefore, the autonomous driving system 100 according to an exemplary embodiment may easily determine the error of the high definition map when information regarding the reduction of available lanes due to a road construction is not reflected in the high definition map.

Referring to FIG. 8, it may be identified that the type of the highway toll gate based on the front image data 300 is an open type, and the type of the highway toll gate based on the high definition map 400 is a closed type.

In the situation shown in FIG. 8, the controller 140 may determine the coordinates of the vehicle 1 on the high definition map 400 as the middle lane based on the number of left lanes.

Thereafter, in the case of the vehicle 1 passes through the toll gate, when the RMSE between the first distance d1 and the third distance d3 and/or the RMSE between the second distance d2 and the fourth distance d4 is greater than or equal to the predetermined first value, the controller 140 may correct the coordinates of the vehicle 1 on the high definition map 400 such that the sum of the RMSE between the first distance d1 and the third distance d3 and the RMSE between the second distance d2 and the fourth distance d4 is minimized.

Nevertheless, when it is determined that the RMSE between the first distance d1 and the third distance d3 or the RMSE between the second distance d2 and the fourth distance d4 is greater than or equal to the predetermined first value, the map quality index of the high definition map 400 may be reduced.

Therefore, the autonomous driving system 100 according to an exemplary embodiment may easily determine the error of the high definition map when information regarding that the closed toll gate has been changed to the open toll gate is not reflected in the high definition map.

Although not shown in FIG. 4, when a color or a shape of a lane detected in response to processing the front image data and the forward detection data and a color or a shape of a lane acquired in response to processing the high definition map are different, the controller 140 may reduce the map quality index of the high definition map.

In other words, even when the RMSE between the first distance d1 and the third distance d3 and/or the RMSE between the second distance d2 and the fourth distance d4 are/is smaller than the predetermined first value, the map quality index may be reduced.

Figure 9:
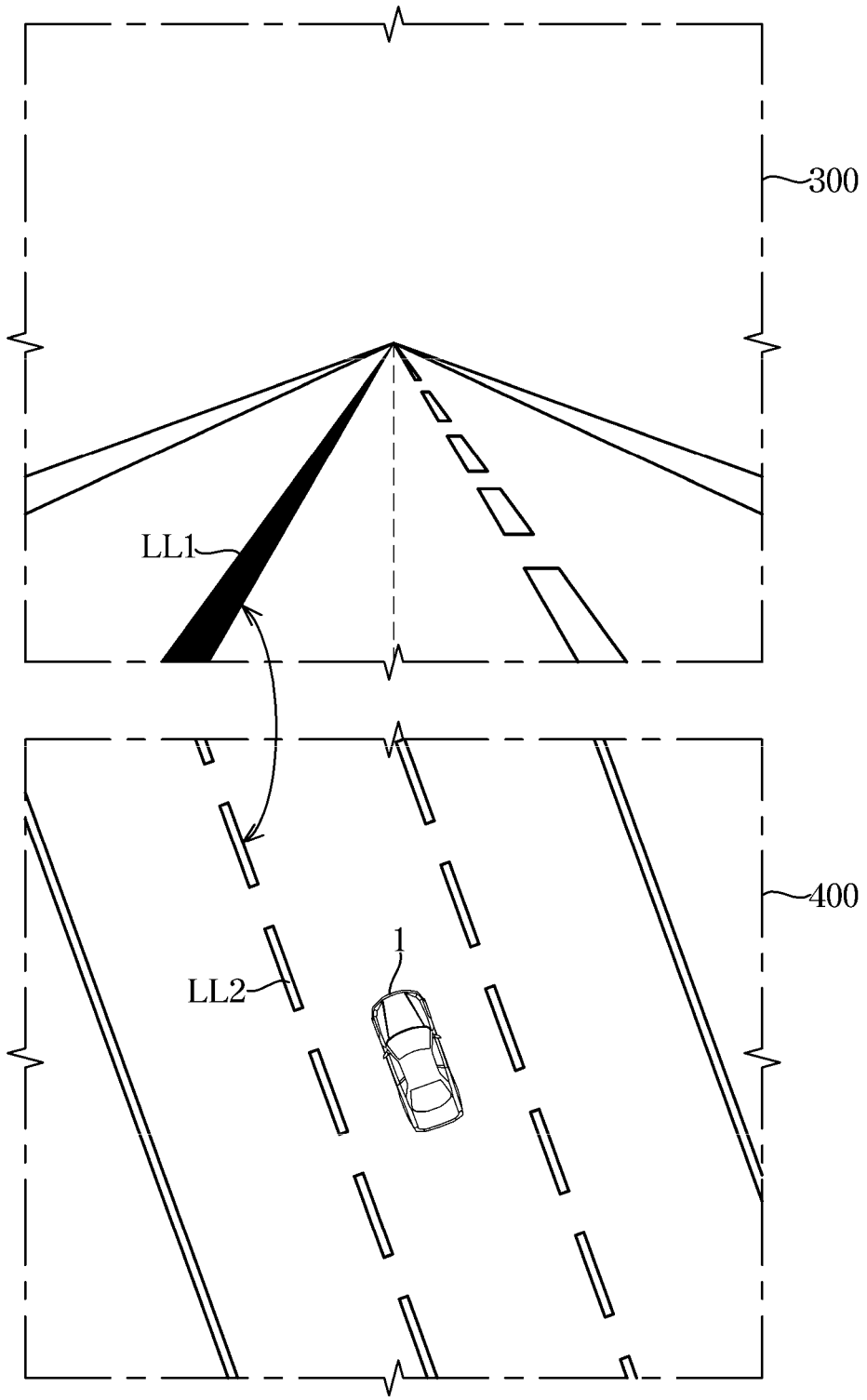

For example, referring to FIG. 9, it may be identified that the color and shape of a left lane LL1 based on the front image data 300 and the color and shape of a left lane LL2 based on the high definition map 400 are different.

In other words, when the left lane LL1 based on the front image data 300 is a solid blue line and the left lane LL2 based on the high definition map 400 is a dotted white line, the controller 140 may reduce the map quality index of the high definition map 400.

Therefore, the autonomous driving system 100 according to an exemplary embodiment may easily determine the error of the high definition map when information regarding that a general lane has been changed to a bus-only lane is not reflected in the high definition map.

Figure 10:
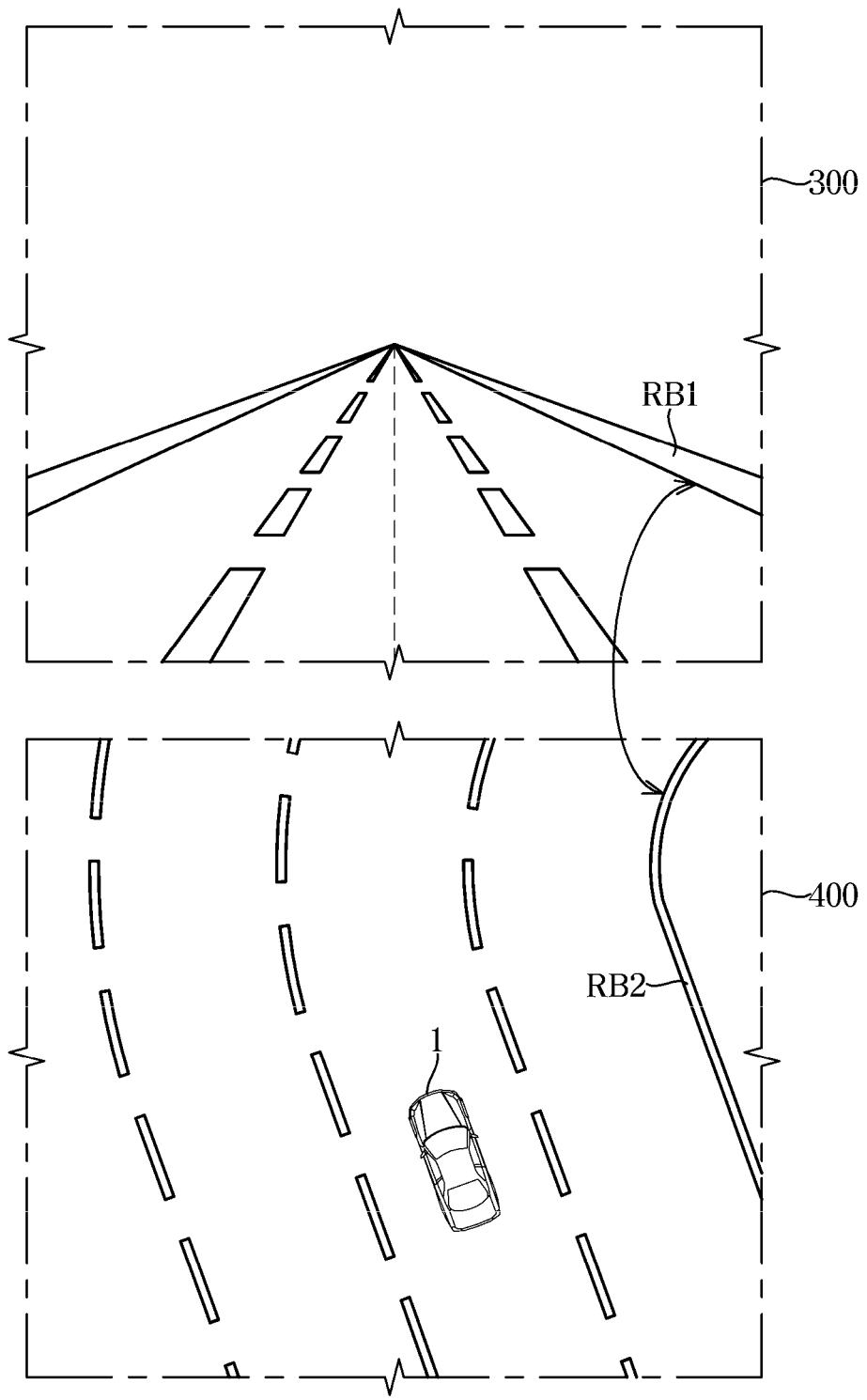

As another exemplary embodiment, referring to FIG. 10, it may be identified that the shape of the right lane RB1 based on the front image data 300 and the shape of the left lane RB2 based on the high definition map 400 are different.

In other words, when the right lane RB1 based on the front image data 300 is a straight line and the right lane RB2 based on the high definition map 400 is a curve, the controller 140 may reduce the map quality index of the high definition map 400.

Therefore, the autonomous driving system 100 according to an exemplary embodiment may easily determine the error of the high definition map when information regarding that the curved lane has been changed to the straight lane is not reflected in the high definition map.

In the case of the vehicle 1 according to an exemplary embodiment being an autonomous driving vehicle, when it is determined that the error of the high definition map being present, the controller 140 may transfer a control right of the vehicle 1 to the driver. In this case, the controller 140 may request the driver to transfer the control right through a user interface provided in the vehicle 1.

Accordingly, the autonomous driving system 100 according to an exemplary embodiment may prevent a malfunction of the autonomous driving system 100 due to the error of the high definition map.

Furthermore, when it is determined that the error of the high definition map being present, the controller 140 may control the communicator 150 to transmit at least one of the front image data and the forward detection data to the cloud server.

Accordingly, the cloud server may quickly eliminate errors in the high definition map.

According to the disclosure, by comparing the actual driving situation of the vehicle 1 to the high definition map, quick determining the error of the high definition map and minimizing the risk of the error are possible.

As is apparent from the above, the embodiments of the disclosure can quickly determine the error of the high definition map to prevent malfunction of the autonomous driving system due to the error of the high definition map.

Meanwhile, the disclosed embodiments may be implemented in the form of a recording media for storing instructions to be carried by a computer. The instructions may be stored in the form of program codes, and when executed by a processor, may generate program modules to perform an operation in the embodiments of the present disclosure. The recording media may correspond to computer-readable recording media.

The computer-readable recording media includes any type of recording media having data stored thereon that may be thereafter read by a compute. For example, it may be a Read Only Memory (ROM), a Random Access Memory (RAM), a magnetic tape, a magnetic disk, a flash memory, an optical data storage device, and the like.

The exemplary embodiments of the present disclosure have thus far been described with reference to accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. An autonomous driving system, comprising:
a first sensor installed in a vehicle, having a field of view facing in front of the vehicle, and configured to acquire front image data;
a second sensor selected from the group consisting of a radar and a light detection and ranging (lidar), installed in the vehicle, having a detection field of view facing in front of the vehicle, and configured to acquire forward detection data;
a communicator configured to receive a high definition map at a current location of the vehicle from an external server; and
a controller including a processor configured to process the high definition map, the front image data, and the forward detection data; wherein
the controller is configured to:
calculate a first distance between the vehicle and a right road boundary line and a second distance between the vehicle and a left road boundary line in response to processing the front image data and the forward detection data,
calculate a third distance between the vehicle and the right road boundary line and a fourth distance between the vehicle and the left road boundary line in response to processing the high definition map,
determine a map quality index of the high definition map based on at least one of a difference between the first distance and the third distance or a difference between the second distance and the fourth distance,
correct coordinates of the vehicle on the high definition map based on the at least one of a difference between the first distance and the third distance or a difference between the second distance and the fourth distance to correct the determined map quality index,
determine whether an error of the high definition map is present based on the corrected map quality index, and
transfer a control right of the vehicle to a driver in response to a determination that the error of the high definition map is present.

2. The autonomous driving system of claim 1, wherein the controller is configured to determine that the error of the high definition map is present when the map quality index is less than or equal to a predetermined threshold value.

3. The autonomous driving system of claim 1, wherein the controller is configured to determine the map quality index by reducing the map quality index in response to determination that the calculated difference between the first distance and the third distance is greater than or equal to a predetermined first value.

4. The autonomous driving system of claim 3, wherein the controller is configured to determine the map quality index by improving the map quality index in response to determination that the calculated difference between the first distance and the third distance is less than or equal to a predetermined second value that is smaller than the predetermined first value.

5. The autonomous driving system of claim 1, wherein the controller is configured to determine the map quality index by reducing the map quality index in response to determination that the calculated difference between the second distance and the fourth distance is greater than or equal to the predetermined first value.

6. The autonomous driving system of claim 5, wherein the controller is configured to determine the map quality index by improving the map quality index in response to determination that the calculated difference between the second distance and the fourth distance is less than or equal to a predetermined second value that is smaller than the predetermined first value.

7. The autonomous driving system of claim 1, wherein the controller is configured to reduce the map quality index when a color or a shape of a lane detected in response to processing the front image data and the forward detection data and a color or a shape of a lane acquired in response to processing the high definition map are different.

8. The autonomous driving system of claim 1, wherein the controller is configured to determine coordinates of the vehicle on the high definition map such that a sum of a RMSE between the first distance and the third distance and a RMSE between the second distance and the fourth distance is minimized.

9. The autonomous driving system of claim 1, wherein the controller is configured to control the communicator to transmit at least one of the front image data and the forward detection data to the server in response to the determination that the error of the high definition map is present.

10. An autonomous driving method, comprising steps of:
acquiring front image data from a front camera installed in a vehicle and having a field of view facing in front of the vehicle;
receiving, by a communicator, a high definition map at a current location of the vehicle from an external server;
calculating, by a controller, a first distance between the vehicle and a right road boundary line and a second distance between the vehicle and a left road boundary line in response to processing the front image data,
calculating, by the controller, a third distance between the vehicle and the right road boundary line and a fourth distance between the vehicle and the left road boundary line in response to processing the high definition map;
determining, by the controller, a map quality index of the high definition map based on at least one of a difference between the first distance and the third distance or a difference between the second distance and the fourth distance;
determining, by the controller, a map quality index of the high definition map based on at least one of a difference between the first distance and the third distance or a difference between the second distance and the fourth distance by correcting coordinates of the vehicle on the high definition map based on the at least one of a difference between the first distance and the third distance or a difference between the second distance and the fourth distance to correct the determined map quality index;
determining whether an error of the high definition map is present based on the corrected map quality index; and transferring a control right of the vehicle to a driver in response to a determination that the error of the high definition map is present.

11. The method of claim 10, wherein the step of determining the error includes determining that the error of the high definition map is present when the map quality index is less than or equal to a predetermined threshold value.

12. Method of claim 10, wherein the step of determining the map quality index includes reducing the map quality index in response to determination that the calculated difference between the first distance and the third distance is greater than or equal to a predetermined first value.

13. The method of claim 12, wherein the step of determining the map quality index includes improving the map quality index in response to determination that the calculated difference between the first distance and the third distance is less than or equal to a predetermined second value that is smaller than the predetermined first value.

14. The method of claim 10, wherein the step of determining the map quality index includes reducing the map quality index in response to determination that the calculated difference between the second distance and the fourth distance is greater than or equal to the predetermined first value.

15. The method of claim 14, wherein the step of determining the map quality index includes improving the map quality in response to determination that the calculated difference between the second distance and the fourth distance is less than or equal to a predetermined second value that is smaller than the predetermined first value.

16. The method of claim 10, further comprising a step of reducing the map quality index when a color or a shape of a lane detected in response to processing the front image data and a color or a shape of a lane acquired in response to processing the high definition map are different.

17. The method of claim 10, further comprising a step of determining coordinates of the vehicle on the high definition map such that a sum of a RMSE between the first distance and the third distance and a RMSE between the second distance and the fourth distance is minimized.

18. The method of claim 10, further comprising a step of controlling the communicator to transmit the front image data to the server in response to the determination that the error of the high definition map is present.

* * * * *